United States Patent
Shangin et al.

(10) Patent No.: US 10,098,182 B2
(45) Date of Patent: *Oct. 9, 2018

(54) RESISTIVE CARBON COMPOSITE MATERIAL

(71) Applicant: OBSHHESTVO S ORGANICHENNOJ OTVETSTVENNOST'JU INZHINIRIINGOVAJA KOMPANIJA "TEPLOFON", Krasnojarsk (RU)

(72) Inventors: Andrei Petrovich Shangin, Krasnoiarsk (RU); Viktor Vasilevich Zvonik, Krasnoiarsk (RU); Vladimir Efimovich Zadov, Krasnoiarsk (RU)

(73) Assignee: OBSHHESTVO S OGRANICHENNOJ OTVETSTVENNOST'JU INZHINIRIINGOVAJA KOMPANIJA "TEPLOFON", Krasnojarsk (RU)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,457

(22) Filed: Feb. 7, 2017

(65) Prior Publication Data

US 2017/0171917 A1 Jun. 15, 2017

Related U.S. Application Data

(63) Continuation-in-part of application No. PCT/RU2015/000490, filed on Aug. 6, 2015.

(30) Foreign Application Priority Data

Aug. 7, 2014 (RU) ................ 2014132728

(51) Int. Cl.
*H01B 1/06* (2006.01)
*H05B 3/14* (2006.01)
*C08K 3/04* (2006.01)

(52) U.S. Cl.
CPC ............. *H05B 3/145* (2013.01); *C08K 3/04* (2013.01); *C08K 2201/001* (2013.01); *C08K 2201/005* (2013.01)

(58) Field of Classification Search
CPC .................... H01C 7/005; H01C 1/00
USPC ...... 252/511, 500; 241/22; 524/496
See application file for complete search history.

(56) References Cited

U.S. PATENT DOCUMENTS

| | | | |
|---|---|---|---|
| 4,600,602 A * | 7/1986 | Martin | H01C 7/005 252/511 |
| 4,985,175 A | 1/1991 | Dziurla et al. | |
| 5,075,036 A | 12/1991 | Parish et al. | |
| 5,445,327 A * | 8/1995 | Creehan | B29C 67/246 241/22 |
| 6,673,864 B2 | 1/2004 | Patel et al. | |
| 7,354,533 B2 | 4/2008 | Yeager et al. | |
| 8,114,314 B2 | 2/2012 | Kotaki et al. | |
| 2004/0016912 A1* | 1/2004 | Bandyopadhyay | C08K 3/04 252/500 |
| 2006/0041050 A1* | 2/2006 | Manane | B82Y 30/00 524/496 |

FOREIGN PATENT DOCUMENTS

| | | |
|---|---|---|
| RU | 2 364 967 C1 | 8/2009 |
| RU | 2 387 105 C2 | 4/2010 |
| RU | 2 393 197 C2 | 6/2010 |
| RU | 2 460 750 C1 | 9/2012 |

OTHER PUBLICATIONS

"Development and Modelling of Electrically Conductive Composite Materials"; by Matthew Lee Clingerman; Bachelor of Science, Michigan Technological University, 1998; A Dissertation, Submitted in partial fulfillment of the requirements for the degree of Doctor of Pholosophy, (Chemical Engineering), Michigan Technological University, 299 pages © 2001 Matthew Lee Clingerman.

* cited by examiner

*Primary Examiner* — Khanh Tuan Nguyen
(74) *Attorney, Agent, or Firm* — Nixon & Vanderhye P.C.

(57) ABSTRACT

Flexible resistive carbon composite material containing conductive phases based on high-electroconductive grades of carbon black with specific surface area of at least 300 to 600 $m^2/g$, particle size of 10-50 nm in combination with graphite or high-electroconductive grades of colloidal graphite with particle size of less than 4 micron, and a heat resistant polymer binder. The heat resistant polymer binder is in a form of a solution of a polyester based on terephthalic acid and sebacic acid or adipic acid and ethylene glycol.

6 Claims, No Drawings

RESISTIVE CARBON COMPOSITE MATERIAL

This application is a Continuation-in-Part of PCT International Application No. PCT/RU2015/000490 filed Aug. 6, 2015 which designated the U.S. and claims priority to Russian Patent Application No. 2014132728 filed Aug. 7, 2014, the entire contents of each of which are hereby incorporated by reference.

TECHNICAL FIELD

The invention relates to electrical engineering, to a composite resistive carbon material in particular, and can be used for preparation of high-conductive pastes and adhesives that provide a reliable electrical contact, as well as in manufacture of industrial and household heaters.

RELATED ART

Production of conductive adhesives and pastes as well as industrial and household heaters demands flexible and heat-proof, up to 150° C., resistive composite materials which according to calculations have surface resistance in the range of 5-200 ohms per square. Specific values depend on heater type and topology of the heating element.

Carbon materials are well known and used as conductive phase in various composite materials.

A composite resistive material (Pugachev G. A. Conductive concrete. Novosibirsk, "Science", 1993, p. 225.) is known consisting of a mixture of betel, which contains carbon black П-80Э —11.43% as a conductive phase, binder—Portland cement M-400—45.72% and quartz sand as a mineral additive—42.85%.

This material has a number of disadvantages such as: long-term heating to a temperature of about 90° C. and higher is impossible, conducting properties of the concrete matrix are volatile, electrical conductivity is low, etc.

Materials consisting of high-conductive carbon black and polymer binder solutions are widely used in manufacture of film heaters with low temperature of heating (underfloor heating, etc.).

A disadvantage of the materials known by the moment is maximum heating temperature of 70° C. and inability to use specific power of about 10 watts per square decimeter required for any heater.

A composition for conductive coatings (RU2460750 C1, C09D133/04, Apr. 21, 2011) is known. It contains a film-forming copolymer, an organic solvent, mixture of electrically conductive graphite-based powder with carbonyl iron and is characterized by carbon black powder (soot) added to the mixture.

A disadvantage of the technical solutions known is low conductivity (almost two orders of magnitude lower than in the present invention) due to suboptimal use of a graphite component (too large particles) and the use of an incorrect type of carbon black. The carbonyl iron does not provide high electrical conductivity due to the significant surface resistance and a proneness to oxidize the surface.

The technical decision closest to the claimed one is a composite resistive material (RU2364967 C1, H01S7/00, Jan. 9, 2008), which contains technical carbon as conductive phase, obtained by channel process, with a highly developed surface area of 400-500 m²/g with particle size of 15 to 25 nm and a polyurethane varnish, with the following ratio of components, wt %: technical carbon 18-22, polyurethane varnish—the rest components. The minimum heating temperature deviation of the heat-radiating coverage area is within ±0.4° C. in the temperature range from 25 to 110° C., the lowest resistivity, according to patent −0.349 ohm*cm ($3.49*10^{-3}$ Ohm*m).

The disadvantage of the solution known is that such electrical resistivity of a material filled with carbon black leads to a surface resistivity of the resistive layer with thickness to 0.1 mm equal 34.9 ohms per square. That is too much for some embodiments of heaters as well as for highly conductive pastes and adhesives. Materials highly filled with dispersed carbon components typically have poor mechanical properties due to lack of the binder.

DISCLOSURE OF THE INVENTION

Object of the invention is to obtain a composite resistive carbon material with high conductivity exceeding claimed in the related art at least an order of magnitude, i.e. 10-15 times or more.

The technical result of the use of the proposed invention is increasing of conductivity and decreasing of resistance gained by optimizing the content of the binder and selection of effective, in terms of percolation theory, conductive components while retaining the flexibility and durability of the conductive composite. Electrical conductivity exceeds maximum stated analogs values significantly, by orders of magnitude, and the change of solvent content allows adjusting colloidal dispersions viscosity in wide range.

The result is achieved by the content of the resistive carbon composite material: according to the invention, it comprises conductive phases based on carbon black and a polymer binder containing conductive phases based on high-electroconductive grades of carbon black in combination with electroconductive colloida grades of graphite and heat-resistant polymeric binder in the form of a solution. At the same time the carbon black which provides high electrical conductivity has a specific surface area of at least 300÷600 m²/g, particles size of 10 to 50 nm; colloidal graphite preparations particles have size of less than 4 microns. To prepare the colloidal suspension a heat resistant polymer binder solution is used as a medium. Besides, polyester based on terephthalic acid or sebacic acid, or adipic acid, or ethylene glycol, or diethylene glycol, or parts of said components such as TP-60 resin is used in the form of a solution as the heat-resistant polymeric binder in the following ratio, wt %:

| | |
|---|---|
| High-electroconductive black carbon (soot) Grades CH-210, 220, 230, 600 | 1-50 |
| | 1-50 |
| Colloidal graphite C-0, C-1, or graphite milled to particles with size less than 4 micron | 1-50 |
| Heat-resistant polymer binder | 1-50 |
| Solvent: chloroform, methylene chloride, Dichloroethane, | else. |

IMPLEMENTATION OF THE INVENTION

Preparation of the composite resistive material is shown in the example of its use.

To create the electrical conductivity of the proposed industrial composites a colloidal graphite preparation C-0 and/or C-1 as well as milled natural graphite pencil as a material of high quality and high electroconductivity were used. Some grades of high-electroconductive carbon black produced in the homeland were used, such as OMCARB™

CH210, and/or OMCARB™ CH220, and/or OMCARB™ CH230 and OMCARB™ CH600.

To obtain the required characteristics of composites some suspensions based on colloidal graphite—carbon black was prepared in the solution of heat-resistant resin TF-60. The suspension systems were prepared in a bead mill in accordance with GOST R 50563.4-93. After dispersion particle size did not exceed 4 microns.

The samples of colloidal suspensions obtained were then selected by syringe and deposited on a square substrate in even layer. After forming a layer liquid and evaporating of the solvent a sample of the resistive composite was generated. Some results are shown below:

TABLE 1

| No | CH-210, Wt % | C-1, % | TF-60 resin, % | solvent % | surface resistance, Ohm/sq. | electrical resistivity, Ohm * m. | electrical conductivity S/m |
|---|---|---|---|---|---|---|---|
| 1 | — | 9.528 | 4.762 | 85.71 | 60.0 | $6.06 * 10^{-3}$ | $1.65 * 10^2$ |
| 2 | 1.589 | 7.939 | 4.762 | 85.71 | 3.0 | $2.79 * 10^{-4}$ | $3.58 * 10^3$ |
| 3 | 1.906 | 7.622 | 4.762 | 85.71 | 2.3 | $2.19 * 10^{-4}$ | $4.57 * 10^3$ |
| 4 | 2.858 | 6.670 | 4.762 | 85.71 | 1.9 | $1.96 * 10^{-4}$ | $5.10 * 10^3$ |
| 5 | 3.810 | 5.718 | 4.762 | 85.71 | 2.3 | $2.23 * 10^{-4}$ | $4.48 * 10^3$ |
| 6 | 4.764 | 4.764 | 4.762 | 85.71 | 3.0 | $2.85 * 10^{-4}$ | $3.51 * 10^3$ |
| 7 | 5.718 | 3.810 | 4.762 | 85.71 | 5.8 | $5.97 * 10^{-4}$ | $1.68 * 10^3$ |
| 8 | 6.670 | 2.858 | 4.762 | 85.71 | 17.8 | $1.74 * 10^{-3}$ | $5.75 * 10^2$ |

Increase of binder content clearly increases the resistance until complete isolation.

Changing of solvent content can adjust the viscosity of suspensions in a wide range. Chloroform or methylene chloride, or dichloroethane is used as the solvent.

Conductivity exceeds maximum values of flexibility that were previously claimed in patents significantly, by orders of magnitude. At the same time strength and conductivity of the composite retain.

The conductivity level of the composite carbon resistive material achieved in the present invention is about 5*103 S/m, which is higher than conductivity claimed in the prior art at least one order of magnitude, i.e., 10-15 times or more.

The material presented is industrially applicable. It can be repeatedly implemented with the achievement of the same technical result.

The result of the technical invention is the simplicity of manufacturing and use of the material as well as low cost of production.

The invention claimed is:

1. A flexible resistive carbon composite material comprising conductive phases based on carbon black in combination with graphite or colloidal graphite, and a heat resistant polymer binder, wherein the heat resistant polymer binder is in a form of a copolymer of ethylene terephthalate with ethylene sebacate or a copolymer of ethylene terephthalate with ethylene adipate.

2. The flexible resistive carbon composite material of claim 1 wherein said carbon black is chosen from OMCARB™ CH210 and/or OMCARB™ CH220 and/or OMCARB™ CH230 and OMCARB™ CH600.

3. The flexible resistive carbon composite material of claim 1 wherein said colloidal graphite is a natural graphite.

4. The flexible resistive carbon composite material of claim 1 produced from a suspension containing: carbon black; graphite or colloidal graphite; a heat-resistant polymer binder in the form of a copolymer of ethylene terephthalate with ethylene sebacate or a copolymer of ethylene terephthalate with ethylene adipate; and at least one solvent selected from the group consisting of chloroform, methylene chloride, and dichloroethane, wherein said the following wherein said components are contained, wt %:

| | |
|---|---|
| the carbon black | 1-50 |
| the colloidal graphite or graphite | 1-50 |
| the heat-resistant polymer binder | 1-50 |
| the at least one solvent: | other. |

5. The flexible resistive carbon composite material of claim 1, wherein the carbon black has a specific surface area of at least 300 to 600 $m^2/g$ and particle size of 10-50 nm.

6. The flexible resistive carbon composite material of claim 1, wherein the graphite or colloidal graphite has a particle size of less than 4 micron.

* * * * *